US007606434B2

(12) United States Patent
Chai et al.

(10) Patent No.: US 7,606,434 B2
(45) **Date of Patent: *Oct. 20, 2009**

(54) APPARATUS AND METHOD FOR FORMING A CODING UNIT

(75) Inventors: Bing-Bing Chai, Plainsboro, NJ (US); Iraj Sodagar, La Jolla, CA (US)

(73) Assignees: Media Tek Inc., Hsin-Chu (TW); Sharp Kabushiki Kaisha, Osaka (JP)

( * ) Notice: Subject to any disclaimer, the term of this patent is extended or adjusted under 35 U.S.C. 154(b) by 311 days.

This patent is subject to a terminal disclaimer.

(21) Appl. No.: 11/228,563

(22) Filed: Sep. 14, 2005

(65) Prior Publication Data

US 2006/0008166 A1 Jan. 12, 2006

Related U.S. Application Data

(63) Continuation of application No. 09/377,383, filed on Aug. 19, 1999, now Pat. No. 6,970,604.

(60) Provisional application No. 60/103,081, filed on Oct. 5, 1998, provisional application No. 60/123,600, filed on Mar. 10, 1999.

(51) Int. Cl.
*G06K 9/46* (2006.01)

(52) U.S. Cl. ....................................... 382/240; 382/232

(58) Field of Classification Search ................. 382/232, 382/233, 240; 375/240.11; 370/432
See application file for complete search history.

(56) References Cited

U.S. PATENT DOCUMENTS

| | | | | |
|---|---|---|---|---|
| 4,893,306 | A | 1/1990 | Chao et al. | |
| 5,168,356 | A | 12/1992 | Acampora et al. | |
| 5,563,960 | A | 10/1996 | Shapiro | |
| 5,796,743 | A | 8/1998 | Bunting et al. | |
| 5,808,570 | A | 9/1998 | Bakhmutsky | |
| 6,526,175 | B2 * | 2/2003 | Sodagar et al. | 382/240 |

(Continued)

FOREIGN PATENT DOCUMENTS

EP 0 797 358 9/1997

(Continued)

OTHER PUBLICATIONS

Karlsson et al. ("Subband coding of video packet networks," Optical Engineering, vol. 27, No. 7, Published on Jul. 1988, pp. 574-586).*

(Continued)

*Primary Examiner*—Duy M Dang
(74) *Attorney, Agent, or Firm*—The Law Offices of Andrew D. Fortney; Andrew D. Fortney

(57) ABSTRACT

An apparatus and a method for forming a data structure that improves error resilience when applied to the coding of hierarchical subband decomposed coefficients, e.g., wavelet transform coefficients. The texture unit is defined as comprising only those AC transform coefficients that are located in one or more slices in a single subband. The texture unit is defined as comprising only those AC transform coefficients that are across "n" subbands, where "n" is smaller number than the total number of "N" levels of decomposition. A texture unit can also be defined as comprising only those bits from the DC transform coefficients that form a single bit-plane.

24 Claims, 8 Drawing Sheets

300

| HEADER 310 | TEXTURE UNIT HAVING AC COEFFICIENTS FROM A SINGLE SUBBAND 320a | MARKER 325 | 320b | MARKER 325 | 320c | ● ● ● |
|---|---|---|---|---|---|---|

320a 320b 320c

LL3 HL3 LH3 HH3 HL2 LH2 HH2 HL1 LH1 HH1

U.S. PATENT DOCUMENTS 6,970,604 B1 * 11/2005 Chai .......................... 382/240

FOREIGN PATENT DOCUMENTS

| GB | 2281465 A | 3/1995 |
|---|---|---|
| GB | 2295936 A | 6/1996 |
| WO | WO 00/54511 | 9/2000 |

OTHER PUBLICATIONS

Gunnar Karlsson and Martin Vetterli; Subband Coding of Video for Packet Networks; Optical Engineering, Soc. of Photo-Optical Instrumentation Engineers, Bellingham, US; Jul. 1, 1988; pp. 574-586; vol. 27, No. 7, ISSN: 0091-3286.

I. Mocagatta, S. L. Regunathan, O. Al-Shaykh and H. Chen; Robust Image Compression with Packetization: The MPEG-4 Still Texture Case; Multimedia Signal Processing, 1998 IEEE Second Workshop on Redondo Beach, CA, USA; Dec. 7-9, 1998; pp. 462-467; ISSN: 0 7803-4919-9; Piscataway, NJ, USA.

European Patent Office Communication; European Search Report for 99960111.5-2223/US9922889; Dated Apr. 19, 2004.

Jerome M. Shapiro; Embedded Image Coding Using Zerotrees of Wavelet Coefficients; IEEE Transactions on Signal Processing; Dec. 1993; pp. 3445-3462; vol. 41, Issue No. 12; IEEE.

Amir Said and William A. Pearlman; A New, Fast, and Efficient Image Codec Based on Set Partitioning in Hierarchical Trees; IEEE Transactions on Circuits and Systems for Video Technology; Jun. 1996; pp. 243-250; vol. 6, Issue No. 3; IEEE.

Jon K. Rogers and Pamela C. Cosman; Robust Wavelet Zerotree Image Compression with Fixed-Length Packetization; IEEE 1998; pp. 418-427; IEEE.

* cited by examiner

| C1 | C2 | C3 | C4 |
|---|---|---|---|
| C5 | C6 | C7 | C8 |
| C9 | C10 | C11 | C12 |
| C13 | C14 | C15 | C16 |

LUMINANCE

| C17 | C18 |
|---|---|
| C19 | C20 |

$C_r$

| C21 | C22 |
|---|---|
| C23 | C24 |

$C_b$

C1 = 1 0 1 1
C2 = 0 0 1 1
C3 = 1 0 0 1
C4 = 1 1 1 1
•
•
•
C16 = 1 0 1 1

$b_1$ $b_2$ $b_3$ $b_4$

C17 = 1 0 1 1
C18 = 0 0 1 1
C19 = 1 0 0 1
C20 = 1 1 1 1

$b_{5-8}$

C21 = 1 0 1 1
C22 = 0 0 1 1
C23 = 1 0 0 1
C24 = 1 1 1 1

$b_{9-12}$

APPARATUS AND METHOD FOR FORMING A CODING UNIT

This is a continuation of application Ser. No. 09/377,383, filed Aug. 19, 1999, issued as U.S. Pat. No. 6,970,604 on Nov. 29, 2005.

This application claims the benefit of U.S. Provisional Application No. 60/103,081 filed on Oct. 5, 1998 and U.S. Provisional Application No. 60/123,600 filed on Mar. 10, 1999, which are herein incorporated by reference.

The invention relates to a data structure in the field of digital multimedia communications. More particularly, the invention relates to a formation of a data structure that improves error resilience when applied to the coding of hierarchical subband decomposed coefficients, e.g., wavelet transform coefficients.

BACKGROUND OF THE DISCLOSURE

In the field of digital multimedia communications, data streams carrying video, audio, timing and control data are packaged into various "packets". Generally, a packet is a group of binary digits that include data and control elements which are switched and transmitted as a composite whole. The data, control elements and other information are arranged in various specific formats.

Examples of such formats are disclosed in various international Standards. These standards include, but are not limited to, the Moving Picture Experts Group Standards (e.g., MPEG-1 (11172-*), MPEG-2 (13818-*) and MPEG4 (14496-*)), H.261 and H.263. For example, MPEG defines a packet as consisting of a header followed by a number of contiguous bytes (payload) from an "elementary data stream". An elementary stream is simply a generic term for one of the coded video, coded audio or other coded bitstreams. More specifically, an MPEG-2 "transport stream" packet comprises a header, which may be four (4) or more bytes long with a payload having a maximum length of 184 bytes. Transport stream packets are part of one or more programs that are assembled into a transport stream. The transport stream is then transmitted over a channel with a particular transfer rate.

However, transmission of packets over a noisy communication channel, e.g., wireless communication, may cause corruption in the packets received by a receiver/decoder. Furthermore, some data streams or bitstreams carry compressed data that are correlated in a manner such that partial loss of a packet may cause the receiver/decoder to discard the entire packet. Namely, compression methods are useful for representing information as accurately as possible with a minimum number of bits and thus minimizing the amount of data that must be stored or transmitted. To further increase compression efficiency, some compression methods employ "significance-based" information, e.g., a significance map-value model, to indicate to a receiver/decoder the significance of the transmitted information or absence of transmitted information. The "significance-based" information is often previously defined, e.g., using symbols, such that the receiver/decoder is able to decipher additional information from the transmitted information. However, the loss of compressed data such as "significance-based" information often results in substantial errors when a receiver/decoder attempts to decompress or decode the corrupted data.

Additionally, another compression techniques involves the transformation of an input image into transform coefficients using hierarchical subband decomposition. For example, a useful compression technique appears in the Proceedings of the International Conference on Acoustics, Speech and Signal Processing, San Francisco, Cal. March 1992, volume IV, pages 657-660, where there is disclosed a signal compression system which applies a hierarchical subband decomposition, or wavelet transform, followed by the hierarchical successive approximation entropy-coded quantizer. A wavelet pyramid, also known as critically sampled quadrature-mirror filter (QMF) subband representation, is a specific type of multiresolution hierarchical subband representation of an image.

More specifically, in a hierarchical subband system, with the exception of the highest frequency subbands, every coefficient at a given scale can be related to a set of coefficients at the next finer scale of similar orientation according to a structure called a wavelet tree. The coefficients at the coarsest scale will be called the parent nodes, and all coefficients corresponding to the same spatial or temporal location at the next finer scale of similar orientation will be called child nodes.

A typical method of coding these transform coefficients is in "tree depth scan order as shown in FIG. 1, where an image is decomposed into three levels of resolution. Specifically, the wavelet coefficients are coded in tree blocks fashion, where each tree block is represented by three separate "texture units" shown with different shadings. Each texture unit is representative of a tree structure starting from the lowest or coarsest AC band to the highest or finest AC band coefficients. However, as the image size is increased, each texture unit will encompass a greater number of transform coefficients such that each texture unit is coded using more than one packet. This can cause more information loss if error occurs in one of these packets.

Namely, the loss of a portion of a texture unit, will often cause a significant error or loss of data. Therefore, there is a need in the art for an apparatus and method for formulating a data structure or coding unit, e.g., a new texture unit, to packetize such transform coefficients to improve error resilience, regardless of the packet protocol that is employed.

SUMMARY OF THE INVENTION

The present invention is an apparatus and a method for forming a data structure that improves error resilience when applied to the coding of hierarchical subband decomposed coefficients, e.g., wavelet transform coefficients. In the present invention, the data structure is referred to as a "texture unit".

In one embodiment, the texture unit is defined as comprising only those AC transform coefficients that are located in one or more rows in a single subband. For example, a single slice of transform coefficients in a $HL_1$ subband is collected as a texture unit and then packetized.

In a second embodiment, the texture unit is defined as comprising only those AC transform coefficients that are located in all the subbands of a decomposition level. For example, a single slice of transform coefficients from each of the $HL_3$, $HH_3$, $LH_3$ subbands are collected as a texture unit and then packetized.

In a third embodiment, the texture unit is defined as comprising only those AC transform coefficients that are across "n" subbands, where "n" is a smaller number than the total number of "N" levels of decomposition. Namely, the "depth" of a texture unit in terms of subband is limited to a fixed value of "n". This allows a larger image to be decomposed to a greater number of levels of resolution while minimizing the possibility of having a single texture unit being encoded onto more than one packet. For example, transform coefficients from the $HL_2$ and $HL_1$ subbands can be collected as a texture unit and then packetized.

In a fourth embodiment, if the DC component for each of the color components (luminance (Y), $C_r$ (U) and $C_b$ (V)) is coded in bitplanes, then the texture unit is defined as comprising a bitplane from any color components. Thus, each bitplane of the DC transform coefficients is encoded as a single texture unit.

In a fifth embodiment, the packet size varies in accordance with a subband or decomposition level of the hierarchical subband decomposed image. Namely, in the context of hierarchical subband coding, a smaller packet size is employed for the lower frequency subbands and a larger packet size is employed for the higher frequency subbands.

The present coding method and data structures provide error resilience. Namely, if an error occurs in a packet or a portion thereof, the overall amount of information that is lost will be minimized. In fact, it is likely that the receiver/decoder may account for the loss by applying various error recovery methods.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
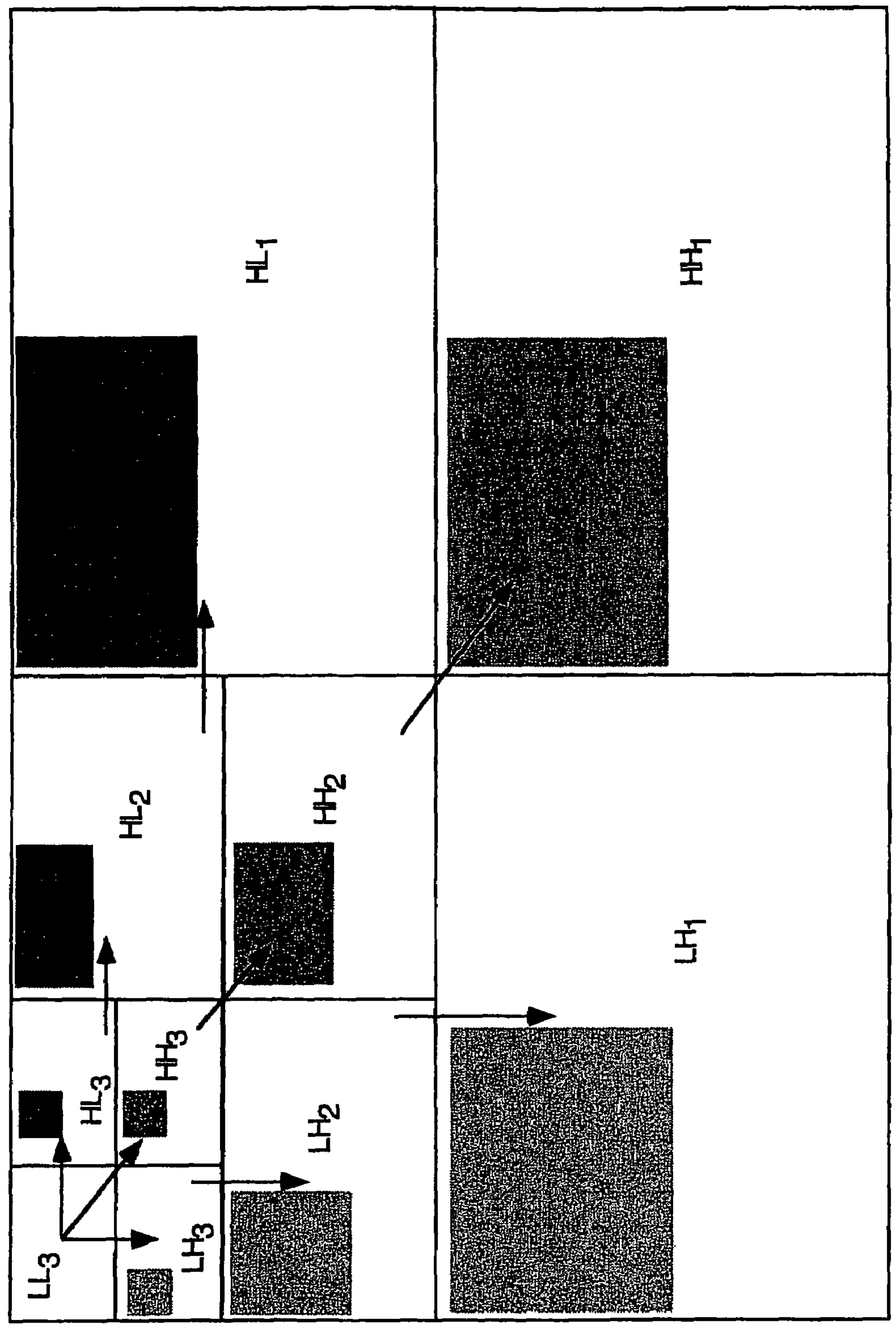
FIG. 1 is a schematic illustration of the parent-child dependencies of subbands in an image decomposed to three levels within a wavelet tree having a plurality of texture units as used in the prior art.
Figure 2:
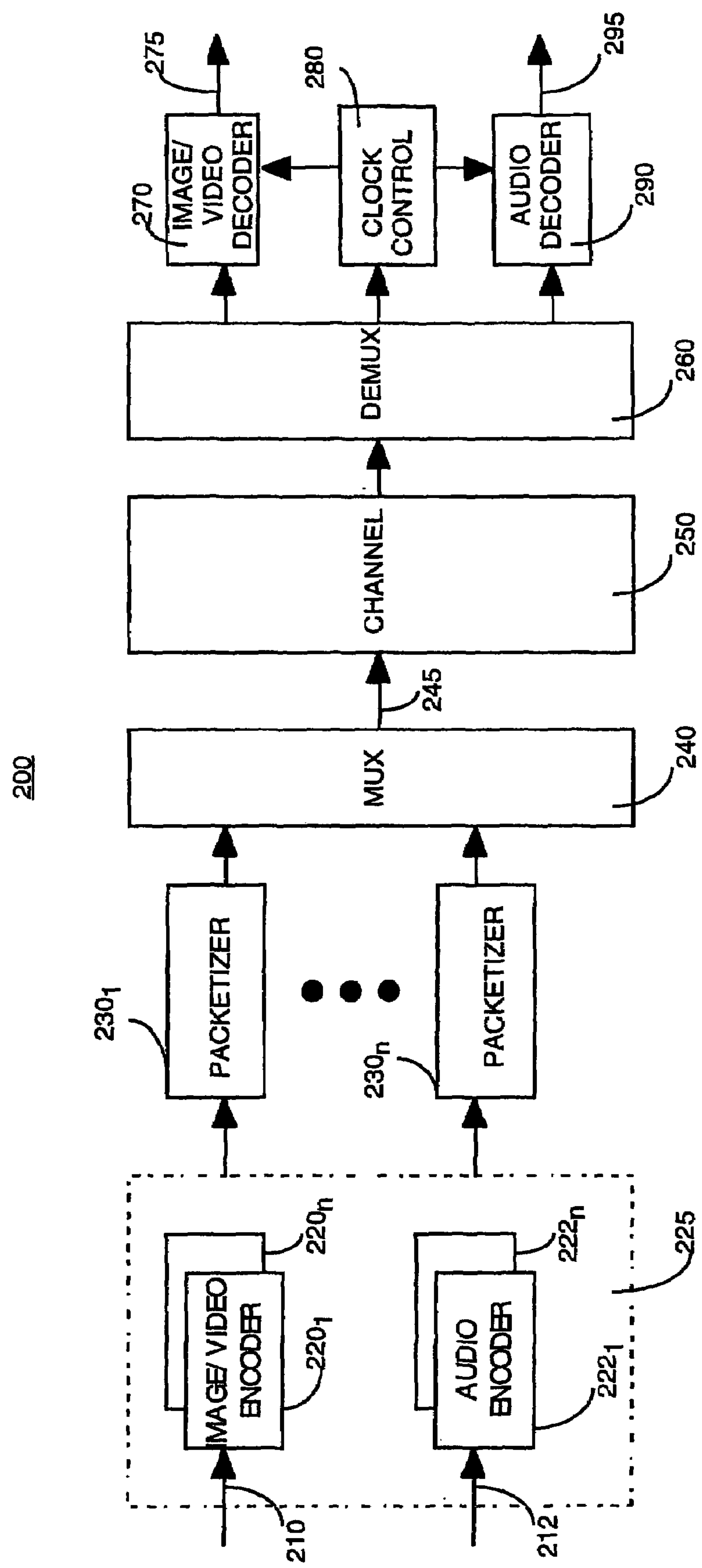
FIG. 2 depicts a block diagram of a simplified packet stream system of the present invention.

FIG. 2 depicts a block diagram of a simplified structure of a packet stream system 200 of the present invention. For illustration, a data stream such as a "transport stream" as defined in accordance with the MPEG standards is used in the packet stream system illustrated in FIG. 2. Although the present invention is described below using the transport stream as an example, those skilled in the art will realize that the present invention can be applied to any packet streams, e.g., an MPEG "program stream" or any other packet streams in accordance with other formats. Furthermore, although the present invention is described below using the term "stream", it should be understood that the various operations described below may be performed on the entire stream or portion thereof.

System 200 includes an image/video encoder 220 for receiving and encoding video data 210 into an elementary video bitstream. The video encoder 220 is an encoder capable of generating hierarchical subband decomposed coefficients, e.g., wavelet coefficients with or without significance-based information. The image/video encoder 220 may be a single image encoder, e.g., a Joint Photographic Experts Group (JPEG) encoder, GIF, PICT, and the like, or an encoder for an image sequence (video), e.g., a block-based or wavelet-based image encoder operating in accordance with an MPEG standard. Throughout this disclosure the terms image sequence, images, and video are used interchangeably. In its broadest sense, the invention operates in cooperation with any form of image or image sequence encoder that would benefit from the present packet structures to provide error resilience.

One example of such an encoder is the Sarnoff Very Low Bit Rate (VLBR) encoder, which is disclosed and claimed in U.S. Pat. No. 5,764,805 (issued on Jun. 9, 1998), and is herein incorporated by reference. Other examples of such encoders are disclosed in U.S. patent application entitled "Apparatus And Method For Encoding Zerotrees Generated By A Wavelet-Based Coding Technique" (filed on Oct. 24, 1996 with Ser. No. 08/736,114), which is herein incorporated by reference.

Similarly, the system may include an audio encoder 222 for receiving and encoding audio data 212 into an elementary audio bitstream. However, those skilled in the art will realize that a plurality of image/video encoders 220$_n$ and audio encoders 222$_n$ can be employed to produce a plurality of elementary bitstreams. In fact, the plurality of video and audio encoders can be collectively represented by a server 225, which may employ various encoders and/or may simply contain a plurality (or a library) of stored elementary streams in various storage media. Generally, the output of such server contains interleaved program streams.

In turn, these bitstreams are sent to packetizers 230 of the present invention, where the elementary bitstreams are converted into packets. Information for using the packets independently of the transport stream may be added when the packets are formed. Thus, non-audio/video data are allowed, but they are not shown in FIG. 2. It should be noted that although in a preferred embodiment, the present encoder and the packetizer are implemented in a single module, those skilled in the art will realize that the functions performed by the encoder and the packetizer can be jointly or separately implemented as required by a particular application.

The packets are received and multiplexed by the transport stream multiplexer 240 to produce a transport stream 245. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream 245 is transmitted over a transmission channel 250, which may further incorporate separate channel specific encoder and decoder (not shown). Next, the transport stream 245 is demultiplexed and decoded by a transport stream demultiplexor 260, where the elementary streams serve as inputs to video decoder 270 and audio decoder 290, whose outputs are decoded video signals 275 and audio signals 295, respectively.

Furthermore, timing information is also extracted by the transport stream demultiplexor 260 and delivered to clock control 280 for synchronizing the video and audio decoders with each other and with the channel. Synchronization of the decoders with the channel is accomplished through the use of the "Program Clock Reference" (PCR) in the transport stream. The PCR is a time stamp encoding the timing of the bitstream itself and is used to derive the decoder timing.

As discussed above, the packetizer 230 organizes the bitstream from the encoder into packets for transmission. If the transmission channel 250 is noisy, the transmitted packets can be corrupted or partially lost. Although the present invention describes a method for manipulating a bitstream to form a particular data structure or packet structure within the encoder 220, it should be understood that this operation can also be performed within the packetizer 230. As such, the implementation of the present invention is a matter of designer choice.

Error resilience is particularly important for packets carrying hierarchically decomposed information, i.e., hierarchical subband decomposed coefficients. Hierarchical subband decomposition provides a multi-resolution representation of an image. For example, the image is first decomposed into four subbands, LL, LH, HL, HH, each representing approximately a quarter of the entire frequency band. To obtain the next coarser scale image representation, the LL band is further divided into four subbands. The process can be repeated to form a hierarchical subband pyramid. It should be understood that hierarchical subband decomposition can apply any number of subband decompositions.

Hierarchical subband decomposed coefficients can be packetized into units called "texture packets" for error resilience. A texture packet consists of one or more coding units, named "texture units". Namely, if the texture unit is packetized into a single packet, then the packet is referred to as a texture packet of the hierarchical subband decomposed image. In the present invention, different embodiments for forming a texture unit are disclosed.

Figure 3:
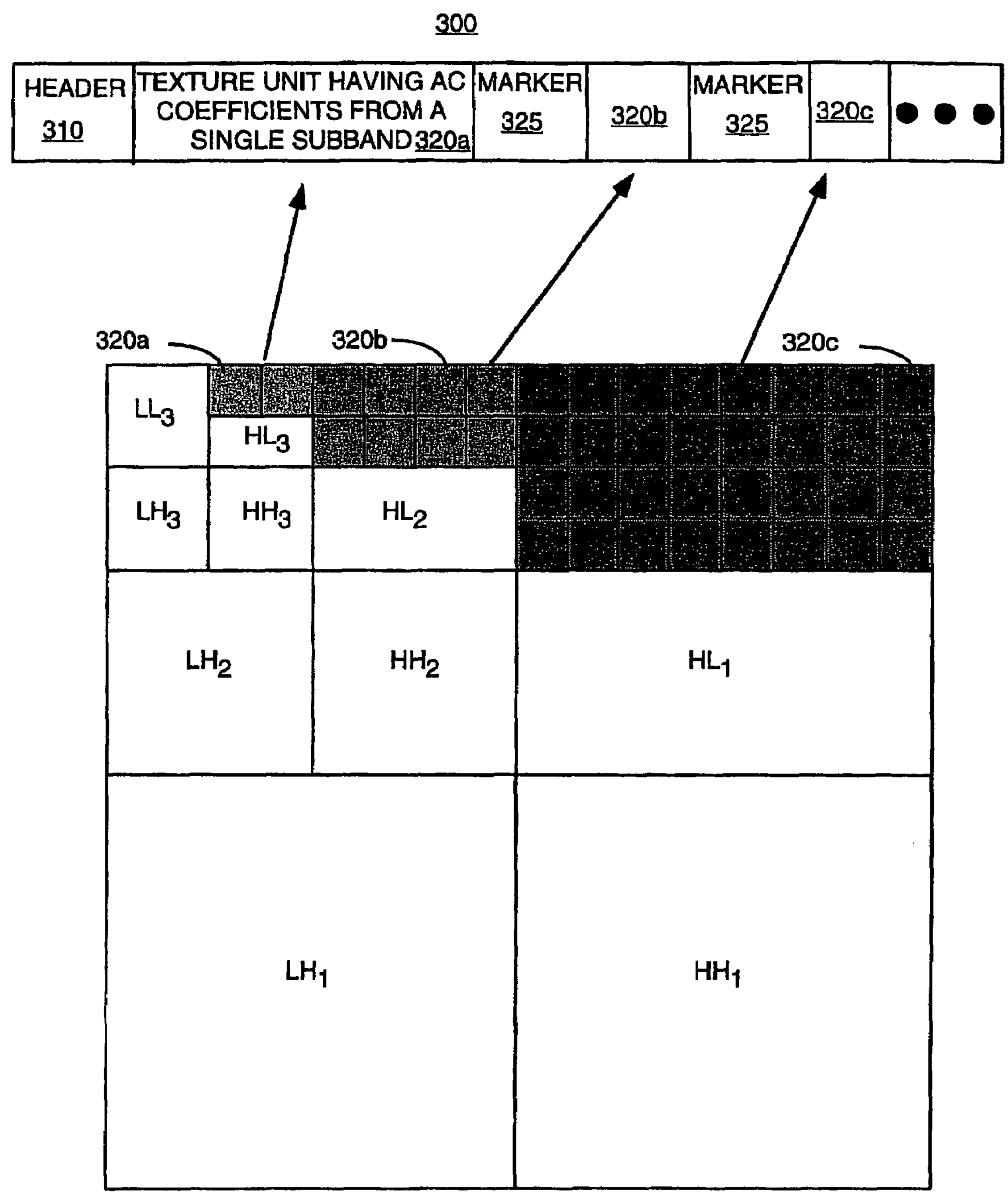
FIG. 3 is a schematic illustration of a texture unit comprising AC coefficients within a single subband and its corresponding packet structure.

FIG. 3 is a schematic illustration of one or more texture units 320*a-c* comprising of a slice of AC coefficients within a single subband. It should be noted that a slice can correspond to one or more rows in a subband. The texture units 320*a-c* are also shown disposed within a packet structure 300 separated by markers 325.

More specifically, FIG. 3 illustrates a hierarchical subband tree structure having been decomposed into three levels or scales of resolution (e.g., 1=0, 1, 2; level 0=$HL_3$, $HH_3$, $LH_3$; etc.), i.e., a slice in a subband is defined as a texture unit. Unlike the prior art, FIG. 3 illustrates a texture unit 320*a* comprising only a single row of coefficients in the $HL_3$ subband. Similarly, FIG. 3 illustrates two other texture units 320*b* and 320*c* comprising two rows and four rows of wavelet coefficients in the $HL_2$ and $HL_1$ subbands, respectively. Namely, the texture unit comprises $2^1$ row(s) of coefficients. In turn, each of these texture units is also shown as being encoded onto a texture packet 300 having a header 310, a plurality of texture units 320.

Although in the present embodiment a single texture unit is shown encoded onto a single texture packet, there may be situations where it is desirable to encode more than one texture unit onto a single texture packet, e.g., small texture units. In such situation, the packet may comprise a marker 325 to demarcate the separation of two texture units 320.

Figure 8:
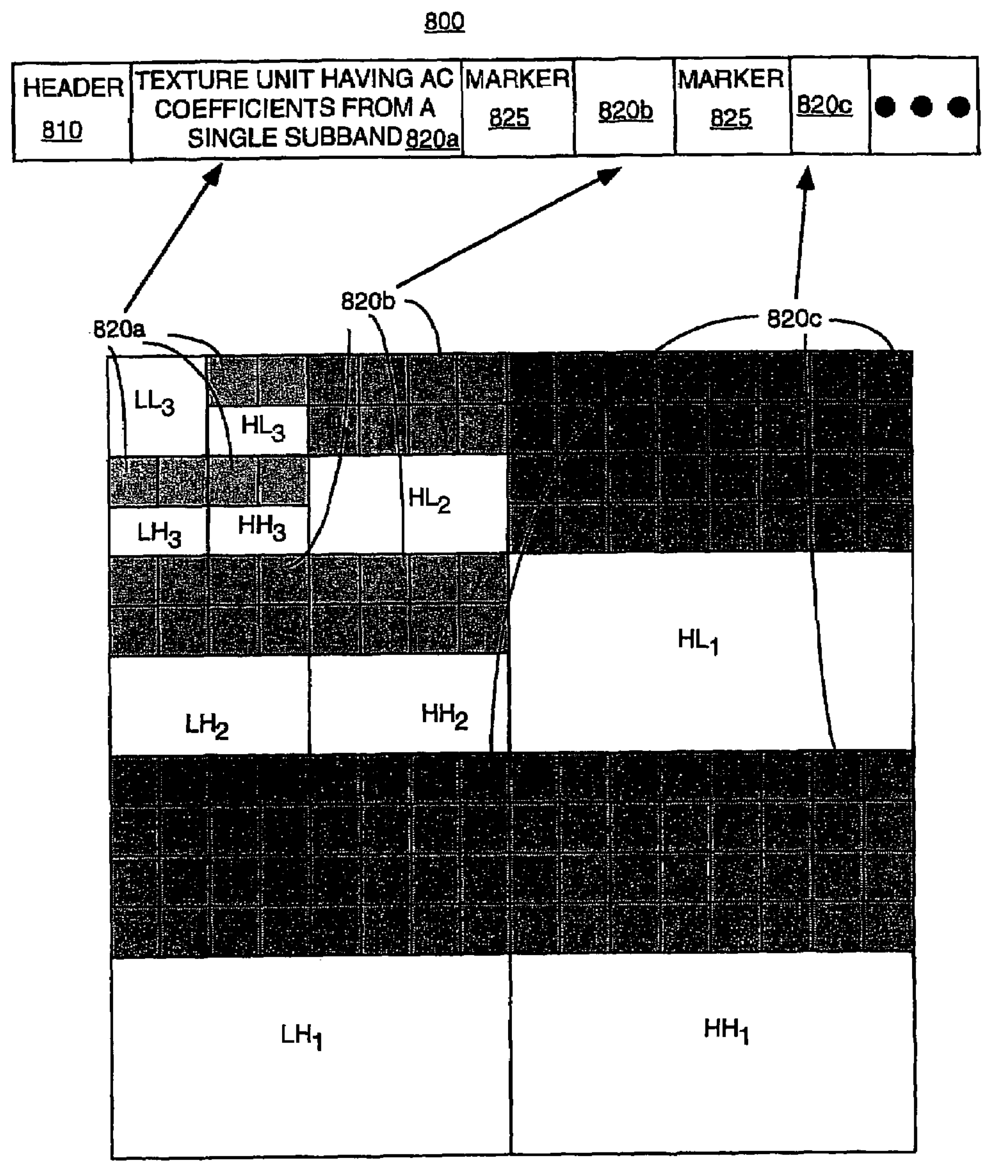
FIG. 8 is a schematic illustration of a texture unit comprising AC coefficients from all subbands of a decomposition level and its corresponding packet structure.

Alternatively, FIG. 8 is a schematic illustration of one or more texture units 820*a-c* comprising of slices of AC coefficients within subbands of a particular decomposition level. This texture unit is referred to as having a layer-by-layer structure. Again, it should be noted that a slice can correspond to one or more rows in a subband. In turn, the texture units 820*a-c* are also shown disposed within a packet structure 800 separated by optional markers 825.

More specifically, FIG. 8 illustrates a hierarchical subband tree structure having been decomposed into three levels or scales of resolution (e.g., 1=0, 1, 2; level 0=$HL_3$, $HH_3$, $LH_3$; etc.), i.e., slices in all the subbands of a particular decomposition level are defined as a texture unit. Namely, FIG. 8 illustrates a texture unit 820*a* comprising three rows of coefficients from the $HL_3$, $HH_3$ and $LH_3$ subbands. Similarly, FIG. 8 illustrates two other texture units 820*b* and 820*c* comprising three sets of two rows of coefficients from the $HL_2$, $HH_{2\ and\ LH2}$ subbands and three sets of four rows of coefficients from the $HL_1$, $HH_1$ and $LH_1$ subbands, respectively. Namely, the texture unit comprises $3\times2^1$ row(s) of coefficients.

Figure 4:
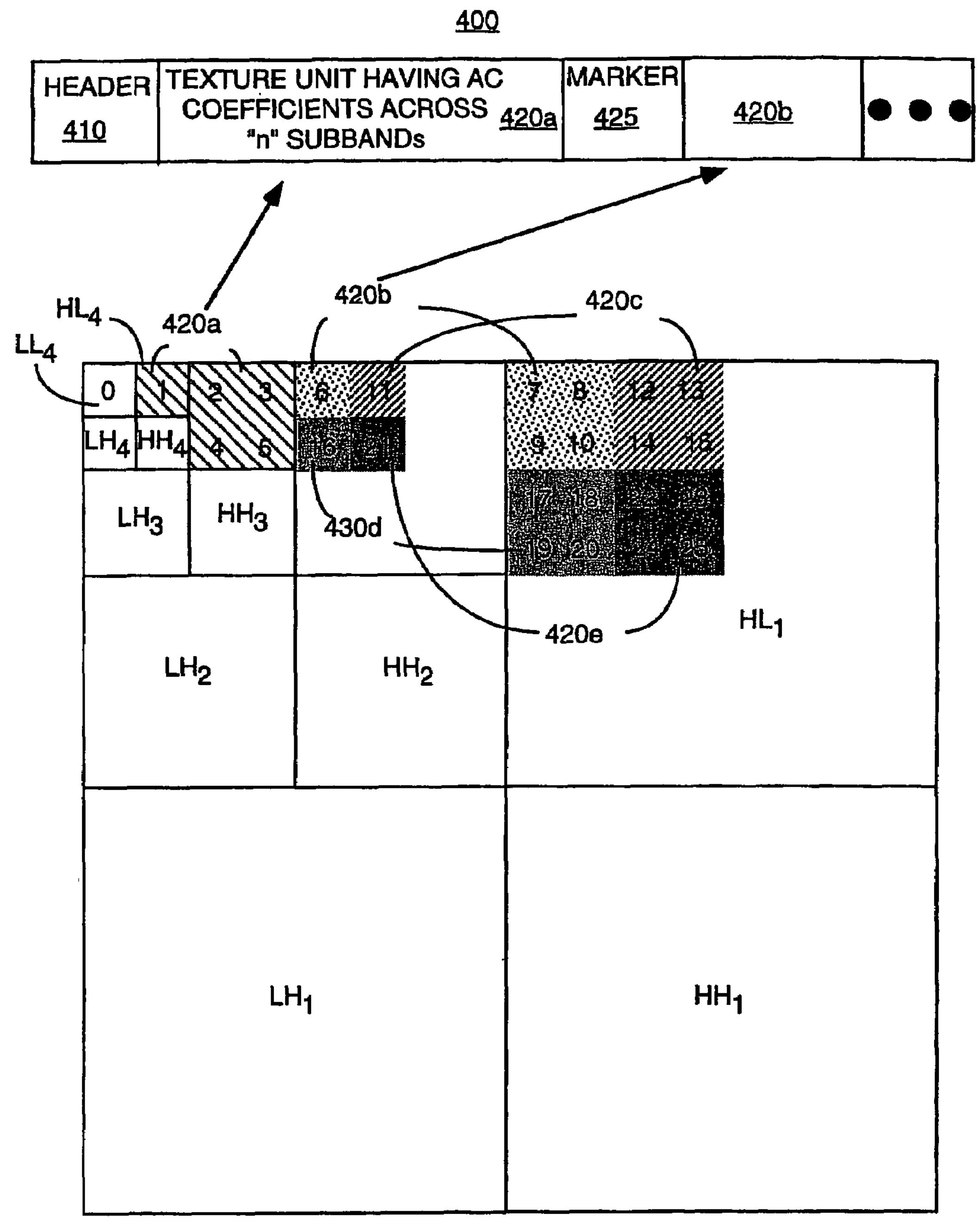
FIG. 4 is a schematic illustration of a texture unit comprising AC coefficients across n-subbands (n=2) and its corresponding packet structure.

Alternatively, FIG. 4 is a schematic illustration of a texture unit 420 comprising of AC coefficients across "n"-subbands (e.g., n=2). The texture unit 420 is also shown disposed within a packet structure 400.

More specifically, FIG. 4 illustrates a wavelet tree structure having been decomposed into four levels or scales of resolution (e.g., 1=0, 1, 2, 3). FIG. 4 shows an example of "depth 2" texture units, where all texture units contain the same number of coefficients. Unlike the prior art, FIG. 4 illustrates a texture unit 420*a* comprising coefficients across two subbands, $HL_4$ and $HL_3$. Similarly, FIG. 4 illustrates four other texture units 420*b* through 420*e* comprising wavelet coefficients across another two subbands, $HL_2$ and $HL_1$. In turn, each of these texture units is shown as being encoded onto a texture packet 400 having a header 410, a texture unit 420.

Again, although in the present embodiment a single texture unit 420 is shown encoded onto a single texture packet, there may be situations where it is desirable to encode more than one texture unit onto a single texture packet, e.g., small texture units. In such situation, the packet may comprise a marker 425 to demarcate the separation of two texture units 420.

Namely, the present texture unit formation yields fixed size texture units. If an image is hierarchically subband decomposed into "N" levels, a texture unit is formed as a subtree structure of depth "n" (n<N) with a single coefficient as the root of the subtree, where n can vary from image to image. The formation of texture units can start either from the highest AC band or from the lowest AC band. It is possible that (N MOD n)≠0, thus some texture units will have only (N MOD n) depth. If these texture units are too small, they can be combined with the next texture unit in coding order onto the same packet as shown in packet 400. With the new texture unit formation, the coding order of coefficients is such that all coefficients within a texture unit are coded before coding the next texture unit.

Figure 5:
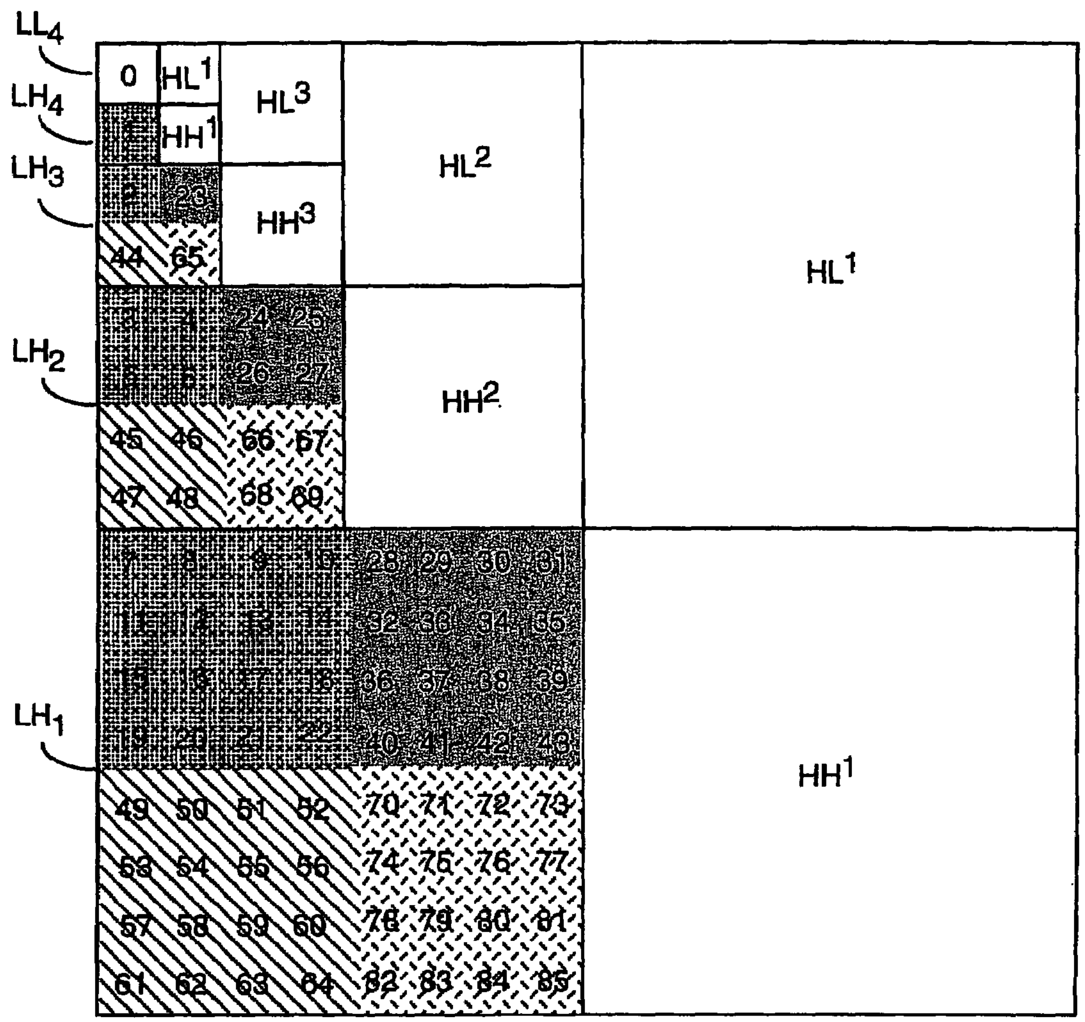
FIG. 5 is a schematic illustration of a texture unit comprising AC coefficients across n-subbands (n=3)

FIG. 5 shows an example of "depth 3" texture units that are formed from the highest AC bands. In this case, there are four (4) hierarchical subband decomposition levels, where the lowest AC band has only one coefficient as a texture unit that is too small, thus it is combined into the next texture unit, forming the text unit with coefficients 1-22.

Figures 6, 9:
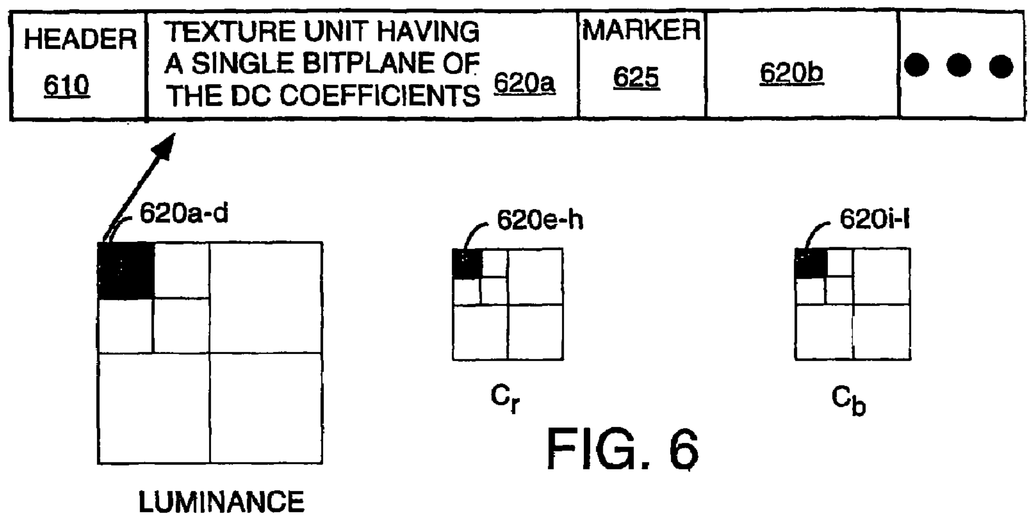
FIG. 6 is a schematic illustration of a texture unit comprising of a single bitplane from the DC band.
FIG. 9 is a detailed schematic illustration of a texture unit comprising only those bits from the DC transform coefficients that form a single bitplane.

FIG. 6 is a schematic illustration of a texture unit 620 comprising of DC coefficients that are encoded in accordance with bitplanes, e.g., four bitplanes for each color components (Y, U, V). The texture unit 620 is also shown disposed within a packet structure 600.

In this embodiment, each texture unit 620 is defined as comprising only those bits from the DC transform coefficients that form a single bitplane. For example, the DC component $LL_3$ for each image can be represented in three color components: luminance (Y), $C_r$ (U), and $C_b$ (V).

It should be noted that the color components $C_r$, and $C_b$ are typically defined as being one-fourth the size of the corresponding luminance color component.

Referring to FIG. 9, a bitplane $b_n$ is defined as comprising those bits from the DC transform coefficients that are of common "significance". For example, FIG. 9 illustrates 16 DC coefficients for the Y color component and four corresponding DC coefficients for each of the U and V to color components. The non-zero coefficient values are expressed in binary form as an example. Thus, the most significant bit (MSB) of each DC coefficient of the Y color component form one bitplane, which also is defined as a texture unit in this embodiment. In turn, the next bitplane $b_{n+1}$ is formed from the next most significant bit (MSB) of each DC coefficient of the Y color component and so on. Therefore, FIG. 9 illustrates 12 possible bitplanes that correspond to 12 texture units 620*a-l* of FIG. 6. It should be noted that the number of bitplanes is dependent on the maximum magnitude of the DC coefficients. Since the DC band carries more important coefficients as compared to high frequency AC coefficients, the present embodiment of defining a texture unit for the DC coefficients based on each bitplane greatly increases error resiliency. Namely, the lost of one corrupted texture unit will only result in a partial loss of information for each DC coefficient. Thus, by using various error recovery or error concealment methods, error resiliency can be maximized for the important DC coefficients by defining each texture unit as comprising only those bits from the DC transform coefficients that form a single bitplane.

Returning to FIG. 6, although in the present embodiment a single texture unit 620 is shown encoded onto a single texture packet, there may be situations where it is desirable to encode more than one texture unit onto a single texture packet, e.g., small texture units. In such situation, the packet may comprise a marker 626 to demarcate the separation of two texture units 620. Thus, the size, shape and levels of resolution can be selectively defined for a texture unit in accordance with a particular application using one of the above texture unit formation embodiments.

Furthermore, as noted above, the importance of the coefficients in different subbands (or frequency range) is different. In general, in hierarchical subband coding, the coefficients in the lower frequency bands are more important than the ones in higher frequency bands. Thus, instead of using constant target length for all packets, in one embodiment of the present invention, the target packet size varies in accordance with subbands and decomposition levels. Specifically, a smaller packet size is employed for the more important coefficients and a larger packet size is employed for the less important coefficients. In the context of hierarchical subband coding, a smaller packet size is employed for the lower frequency subbands and a larger packet size is employed for the higher frequency subbands. This embodiment provides greater error protection because the effect from the loss of an "important" texture packet is minimized due to its reduced packet size, i.e., losing less information for each corrupted important packet.

More specifically, the present embodiment employs a small packet size of N bits for the lowest frequency subband, e.g., $LL_3$. Next, the packet size is increased to "a"×N, where "a" is greater than or equal to 1 for the subbands of the next decomposition level, e.g., $HL_3$, $HH_3$, and $LH_3$ and so on.

It should be noted that in the present invention, the coding of coefficients means the coding of the coefficient values and/or the significant symbols (e.g., if zerotree encoding is employed). Specifically, zerotree encoding is an example of an encoding method that employs wavelet transform to generate a plurality of wavelet coefficients with "coefficient significance information" in the form of a significance map. The significance map is entropy coded using a plurality of symbols: ZEROTREE ROOT (ZTR), VALUED ZEROTREE ROOT (VZTR), ISOLATED ZERO (IZ) and VALUE. A ZEROTREE ROOT symbol denotes a coefficient that is the root of a zerotree. A VALUED ZEROTREE ROOT symbol is a node where the coefficient has a non-zero value and all four children are ZEROTREE ROOTS. An ISOLATED ZERO symbol identifies a coefficient with zero value, but with some descendant somewhere further along with a nonzero. Furthermore, if a leave has a zero value, it can also be assigned as an ISOLATED ZERO. A VALUE symbol identifies a coefficient with a non-zero value, but also with some descendant somewhere further along the tree that has a non-zero value.

Figure 7:
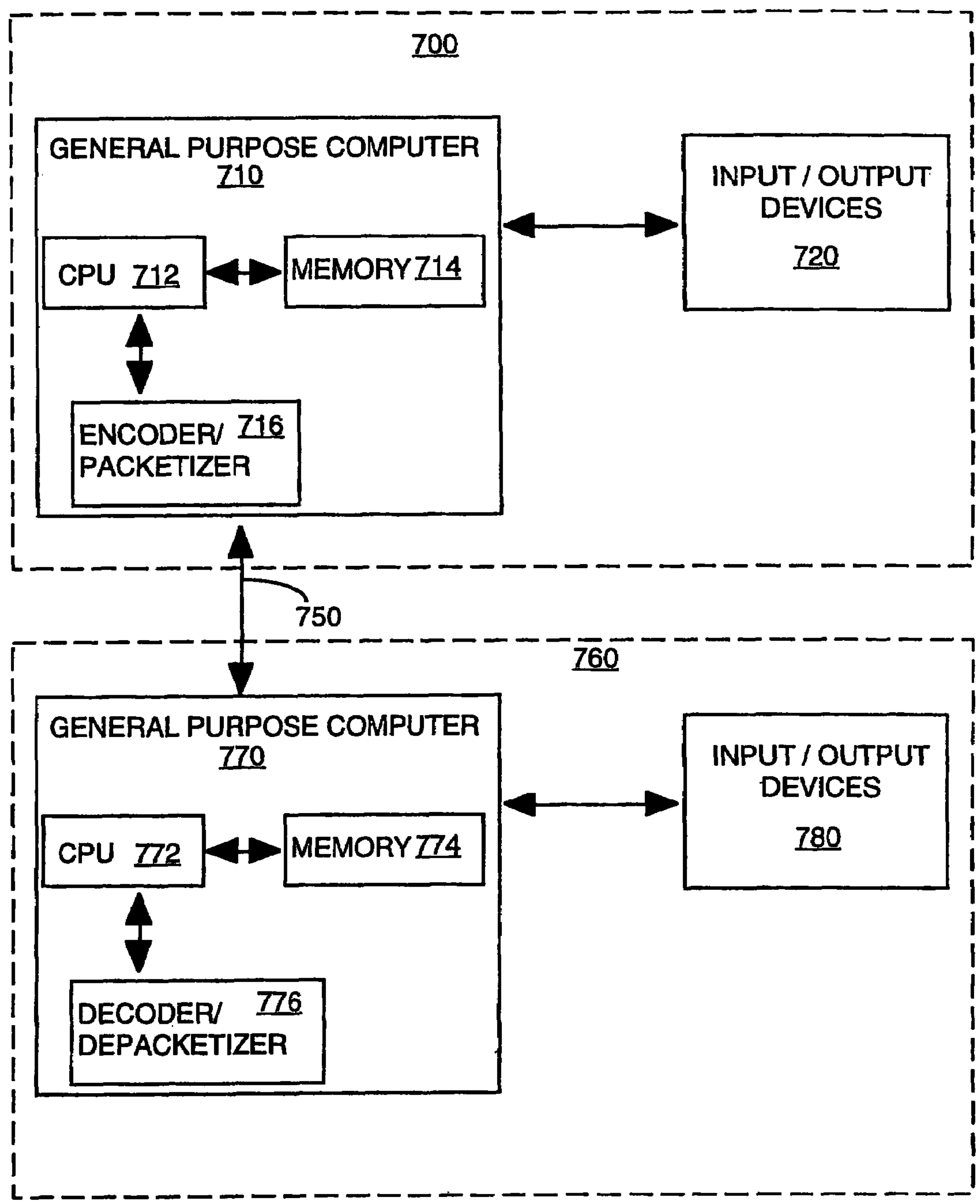
FIG. 7 illustrates a block diagram of an encoding system and a decoding system of the present invention.

FIG. 7 illustrates a block diagram of an encoding system 700 and a decoding system 760 of the present invention. The encoding system 700 comprises a general purpose computer 710 and various input/output devices 720. The general purpose computer comprises a central processing unit (CPU) 712, a memory 714 and an encoder/packetizer 716 for encoding and packetizing an image, video and/or audio signal.

In the preferred embodiment, the encoder/packetizer 716 is simply the video encoder 220, the audio encoder 222 and/or the packetizer 230 as discussed above in FIG. 2. It should be understood that the encoders and the packetizer can be implemented jointly or separately. The encoder/packetizer 716 can be physical devices which are coupled to the CPU 712 through a communication channel. Alternatively, the encoder/packetizer 716 can be represented by a software application (or a combination of software and hardware, e.g., using application specific integrated circuits (ASIC)), where the software is loaded from a storage medium, (e.g., a magnetic or optical drive or diskette) and operated by the CPU in the memory 714 of the computer. As such, the en coder/packetizer 716 of the present invention can be stored on a computer readable medium. In turn, the packets 300 through 600, which are generated by the encoder/packetizer 716, can also be stored on a computer readable medium, e.g., RAM memory, magnetic or optical drive or diskette and the like.

The computer 710 can be coupled to a plurality of input and output devices 720, such as a keyboard, a mouse, an audio recorder, a camera, a camcorder, a video monitor, any number of imaging devices or storage devices, including but not limited to, a tape drive, a floppy drive, a hard disk drive or a compact disk drive.

The encoding system is coupled to the decoding system via a communication channel 750. The present invention is not limited to any particular type of communication channel.

The decoding system 760 comprises a general purpose computer 770 and various input/output devices 780. The general purpose computer comprises a central processing unit (CPU) 772, a memory 774 and an decoder/depacketizer 776 for receiving and decoding a sequence of encoded images.

In the preferred embodiment, the decoder/depacketizer 776 is simply any decoders that are complementary to the encoder/packetizer 716 as discussed above for decoding the bitstreams generated by the encoder/packetizer 716. The decoder 776 can be a physical device which is coupled to the CPU 772 through a communication channel. Alternatively, the decoder/depacketizer 776 can be represented by a software application which is loaded from a storage device, e.g., a magnetic or optical disk, and resides in the memory 774 of the computer. As such, any of complementary decoders of the encoder/packetizer 716 of the present invention can be stored on a computer readable medium.

The computer 760 can be coupled to a plurality of input and output devices 780, such as a keyboard, a mouse, a video monitor, or any number of devices for storing or distributing images, including but not limited to, a tape drive, a floppy drive, a hard disk drive or a compact disk drive. These input/output devices allow the computer to store and distribute the sequence of decoded video images.

Although various embodiments which incorporate the teachings of the present invention have been shown and described in detail herein, those skilled in the art can readily devise many other varied embodiments that still incorporate these teachings.

What is claimed is:

1. A computer readable medium having stored thereon a data structure comprising:

a packet header; and a payload comprising a first texture unit consisting of AC coefficients from a first single subband of a hierarchical subband decomposed image, a first marker after said first texture unit, and a second texture unit after said first marker, said second texture unit consisting of AC coefficients from a second single subband of said hierarchical subband decomposed image, said second single subband being different from said first single subband.

2. The computer readable medium of claim 1, wherein said data structure further comprises a second marker after said second texture unit, and a third texture unit consisting of AC coefficients from a second single subband of said hierarchical subband decomposed image after said second marker, said third single subband being different from said first and second single subbands.

3. A computer readable medium having stored thereon a data structure comprising:

a packet header; and a payload comprising a first texture unit, said first texture unit including AC coefficients from all subbands of a first decomposition level of a hierarchical subband decomposed image.

4. The computer readable medium of claim 3, wherein said data structure further comprises a first marker after said first texture unit, and a second texture unit after said first marker, said second texture unit comprising AC coefficients from all subbands of a second decomposition level of said hierarchical subband decomposed image, said second decomposition level being different from said first decomposition level.

5. The computer readable medium of claim 4, wherein said data structure further comprises a second marker after said second texture unit, and a third texture unit after said second marker, said third texture unit comprising AC coefficients from all subbands of a third decomposition level of said hierarchical subband decomposed image, said third decomposition level being different from said first and second single subbands.

6. A computer readable medium having stored thereon a data structure comprising:

a packet header; and a payload comprising a first texture unit, said first texture unit consisting of AC coefficients across n subbands, where n represents a number greater than one and smaller than a number of decomposition levels of a hierarchical subband decomposed image.

7. The computer readable medium of claim 6, where n is two.

8. The computer readable medium of claim 6, where n is three.

9. The computer readable medium of claim 6, wherein said data structure further comprises a first marker after said first texture unit, and a second texture unit after said first marker, said second texture unit consisting of AC coefficients across n subbands of said hierarchical subband decomposed image, said subbands of said second texture unit being different from said subbands of said first texture unit.

10. The computer readable medium of claim 9, wherein said data structure further comprises a second marker after said first texture unit, and a third texture unit after said second marker, said third texture unit consisting of AC coefficients across n subbands of said hierarchical subband decomposed image, said subbands of said third texture unit being different from said subbands of said first and second texture units.

11. A computer readable medium having stored thereon a data structure comprising:

a packet header; and a payload comprising a first texture unit, said first texture unit including bits from a first plurality of DC transform coefficients that form a first single bitplane.

12. The computer readable medium of claim 11, wherein said data structure further comprises a first marker after said first texture unit, and a second texture unit after said first marker, said second texture unit comprising bits from a second plurality of DC transform coefficients that form a second single bitplane of said hierarchical subband decomposed image, said second single bitplane being different from said first single bitplane.

13. The computer readable medium of claim 12, wherein said data structure further comprises a second marker after said second texture unit, and a third texture unit after said second marker, said third texture unit comprising bits from a third plurality of DC transform coefficients that form a third single bitplane of said hierarchical subband decomposed image, said third single bitplane being different from said first and second single bitplanes.

14. A method for packetizing a hierarchical subband decomposed image having a plurality of decomposition levels, said method comprising the steps of:

(a) generating a packet header with a computer having a packetizer thereon; and (b) generating a payload with said computer, said payload comprising a first texture unit consisting of AC coefficients from a first single subband of the hierarchical subband decomposed image, a first marker after said first texture unit, and a second texture unit consisting of AC coefficients from a second single subband of said hierarchical subband decomposed image, said second single subband being different from said first single subband.

15. The method of claim 14, wherein said payload further comprises a second marker after said second texture unit, and a third texture unit consisting of AC coefficients from a second single subband of said hierarchical subband decomposed image after said second marker, said third single subband being different from said first and second single subbands.

16. The method of claim 14, further comprising converting said packet header and said payload into a packet with said packetizer, and transmitting a transport stream comprising said packet over a transmission channel.

17. A method for packetizing a hierarchical subband decomposed image having a plurality of decomposition levels, said method comprising the steps of:

(a) generating a packet header with a computer having a packetizer thereon; and (b) generating a payload with said computer, said payload comprising a first texture unit, said first texture unit including AC coefficients from all subbands of a decomposition level of the hierarchical subband decomposed image.

18. The method of claim 17, wherein said payload further comprises a first marker after said first texture unit, and a second texture unit after said first marker, said second texture unit comprising AC coefficients from all subbands of a second decomposition level of said hierarchical subband decomposed image, said second decomposition level being different from said first decomposition level.

19. The method of claim 17, further comprising converting said packet header and said payload into a packet with said packetizer, and transmitting a transport stream comprising said packet over a transmission channel.

20. A method for packetizing a hierarchical subband decomposed image having a plurality of decomposition levels, said method comprising the steps of:

(a) generating a packet header with a computer having a packetizer thereon; and (b) generating a payload with said computer, said payload comprising a first texture unit, said first texture unit consisting of AC coefficients n subbands, where n represents a number greater than one and smaller than a number of the decomposition levels of the hierarchical subband decomposed image.

21. The method of claim 20, where n is two.

22. The method of claim 20, where n is three.

23. The method of claim 20, wherein said payload further comprises a first marker after said first texture unit, and a second texture unit after said first marker, said second texture unit consisting of AC coefficients across n subbands of said hierarchical subband decomposed image, said subbands of said second texture unit being different from said subbands of said first texture unit.

24. The method of claim 20, further comprising converting said packet header and said payload into a packet with said packetizer, and transmitting a transport stream comprising said packet over a transmission channel.

* * * * *